(12) United States Patent
Sbongk et al.

(10) Patent No.: US 12,716,445 B2
(45) Date of Patent: Aug. 25, 2026

(54) FASTENING APPARATUS

(71) Applicant: ILLINOIS TOOL WORKS INC., Glenview, IL (US)

(72) Inventors: Albert Sbongk, Niederstetten (DE); Jan Müller, Würzburg (DE); Melanie Sindel, Nuremberg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 558 days.

(21) Appl. No.: 18/179,634

(22) Filed: Mar. 7, 2023

(65) Prior Publication Data

US 2023/0287919 A1 Sep. 14, 2023

(30) Foreign Application Priority Data

Mar. 9, 2022 (DE) .................... 10 2022 105 564.7

(51) Int. Cl.
*F16B 21/04* (2006.01)
*F16B 5/06* (2006.01)

(52) U.S. Cl.
CPC ............ *F16B 21/04* (2013.01); *F16B 5/0642* (2013.01); *F16B 2005/0671* (2013.01)

(58) Field of Classification Search
CPC ........ F16B 5/0642; F16B 5/0664; F16B 5/10; F16B 2005/0671; F16B 21/02; F16B 21/04; F16B 21/10; Y10T 403/7005; Y10T 403/7007
See application file for complete search history.

(56) References Cited

U.S. PATENT DOCUMENTS 4,532,622 A * 7/1985 Newbold ........... G11B 17/0282
4,730,952 A * 3/1988 Wiley ....................... B27B 5/32 403/348
5,391,033 A * 2/1995 Gibbons ................ F16B 39/18 411/383

(Continued)

FOREIGN PATENT DOCUMENTS

DE 102017122529 A1 * 3/2019 ........... F16D 25/083
DE 102017125722 A1 5/2019

(Continued)

OTHER PUBLICATIONS

Translated Description of DE-102018126997-A1. Muller, Joachim. Clamping Bolt, Table Top and Clamping System. May 2, 2019.*
"Admitted Prior Art—Agora-Tec (4 pages)".

*Primary Examiner* — Amber R Anderson
*Assistant Examiner* — Kevin J Baynes
(74) *Attorney, Agent, or Firm* — THOMPSON HINE LLP

(57) ABSTRACT

A fastening apparatus for connecting components of different thicknesses includes a base element for insertion into a contoured passage opening of a component, having a first fastening portion in which at least one bayonet-like fastening device is configured for retentive abutment on contour elements of a first component surface of the component, and a rotary element arranged on the base element, having a second fastening portion, in which at least one abutting device for retentive abutment on a second component surface of a component is configured. The base element and the rotary element are rotatably and axially slidably coupled to one another by a threaded axial displacement device.

11 Claims, 3 Drawing Sheets

(56) References Cited

U.S. PATENT DOCUMENTS

| | | | | |
|---|---|---|---|---|
| 5,400,461 | A * | 3/1995 | Malish | A47L 11/162 403/348 |
| 5,570,984 | A * | 11/1996 | Reznikov | H02B 1/26 411/553 |
| 5,619,770 | A * | 4/1997 | Bell | A47L 11/4058 451/514 |
| 5,806,132 | A * | 9/1998 | Kelley | A47L 11/4069 451/353 |
| 6,497,003 | B2 * | 12/2002 | Calabrese | B60N 3/046 296/97.23 |
| 6,955,515 | B2 * | 10/2005 | Barina | F16B 21/02 411/509 |
| 7,891,927 | B2 * | 2/2011 | Burger | F16B 5/0233 411/908 |
| 7,955,038 | B2 * | 6/2011 | Silbereisen | F16B 21/02 24/663 |
| 8,402,605 | B2 * | 3/2013 | Courtin | B60N 3/046 16/8 |
| 8,991,006 | B2 * | 3/2015 | Masanek, Jr. | B60N 3/048 428/167 |
| 9,199,567 | B1 * | 12/2015 | Kaufman | B60N 3/046 |
| 9,482,491 | B1 * | 11/2016 | Luster | F41H 5/013 |
| 9,517,712 | B1 * | 12/2016 | Masanek, Jr. | B60N 3/044 |
| 9,610,880 | B2 * | 4/2017 | Masanek, Jr. | B60N 3/046 |
| 9,771,962 | B2 * | 9/2017 | Metten | F16B 5/0233 |
| 9,926,964 | B2 * | 3/2018 | Philippe | F16B 39/284 |
| 10,124,742 | B2 * | 11/2018 | Martinez | F16B 5/0642 |
| 10,485,307 | B2 * | 11/2019 | Linn | A44B 17/0023 |
| 10,575,598 | B2 * | 3/2020 | Choi | A44B 13/0088 |
| 10,933,817 | B2 * | 3/2021 | Leverger | B60J 5/0468 |
| 10,968,938 | B2 | 4/2021 | Leidig et al. | |
| 11,261,899 | B2 * | 3/2022 | Zander | F16B 5/0642 |
| 11,919,375 | B2 * | 3/2024 | Choi | B60J 5/0416 |
| 11,976,703 | B2 * | 5/2024 | Rose | F16F 15/08 |
| 12,012,049 | B2 | 6/2024 | Leverger et al. | |
| 12,110,917 | B2 * | 10/2024 | Leidig | F16B 21/086 |
| 2002/0090277 | A1 * | 7/2002 | LeVey | F16B 37/042 411/172 |
| 2015/0248975 | A1 * | 9/2015 | Bonfanti | H01R 13/213 200/50.28 |
| 2016/0040705 | A1 * | 2/2016 | Peter | F16B 21/02 403/348 |
| 2020/0408236 | A1 * | 12/2020 | Sánchez Burger | F16B 19/1081 |
| 2022/0120300 | A1 * | 4/2022 | Matthes | F16B 5/0664 |

FOREIGN PATENT DOCUMENTS

| | | | | |
|---|---|---|---|---|
| DE | 102018126997 | A1 | 5/2019 | |
| FR | 2909142 | A1 * | 5/2008 | F16B 37/042 |
| GB | 2587638 | A * | 4/2021 | A01K 1/032 |
| WO | WO-2009068962 | A2 * | 6/2009 | F16B 21/02 |
| WO | WO-2012023448 | A1 * | 2/2012 | F16B 5/0642 |

* cited by examiner

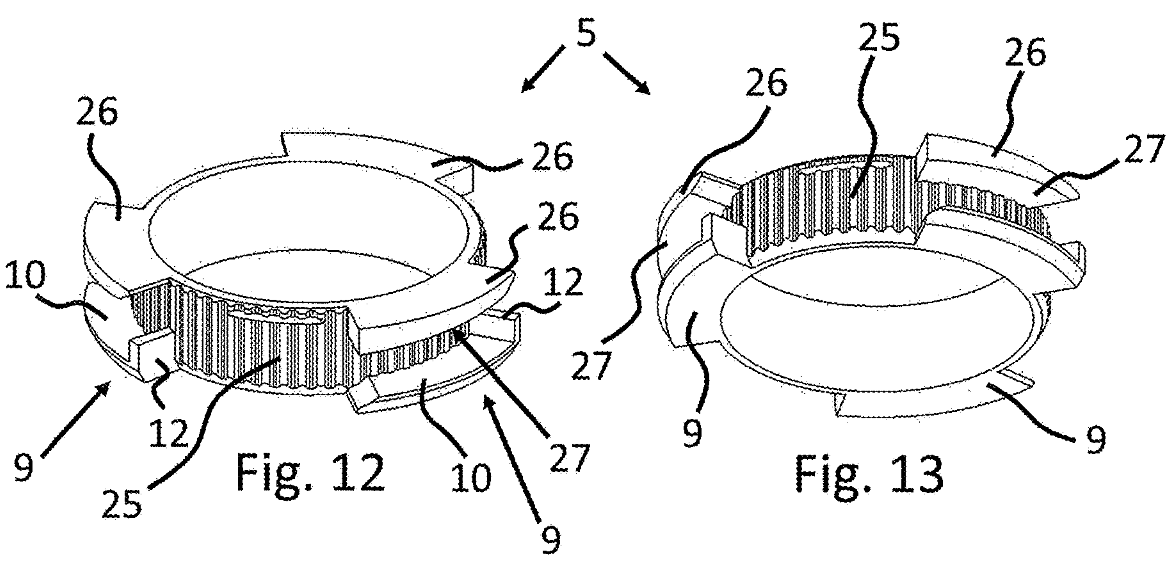
Fig. 12
Fig. 13
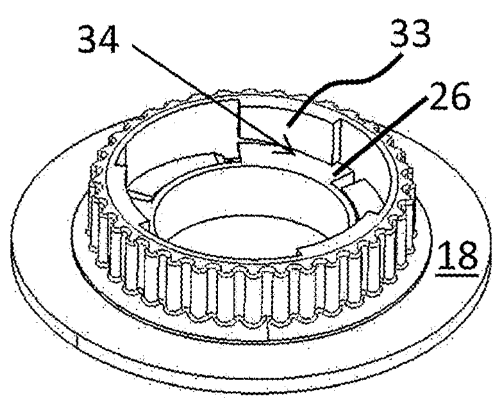
Fig. 14
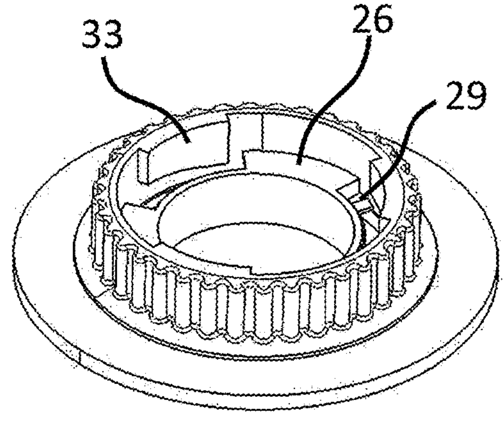
Fig. 15
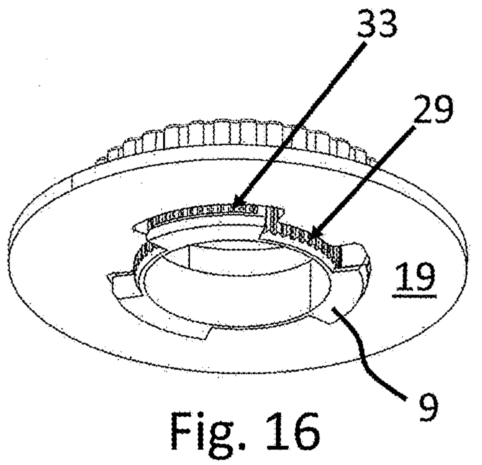
Fig. 16
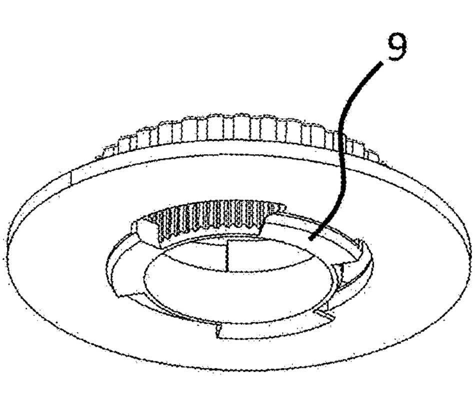
Fig. 17

FASTENING APPARATUS

TECHNICAL FIELD

The present invention relates to a fastening apparatus, in particular for connecting to components of different thicknesses.

BACKGROUND

A connector is disclosed in DE 10 2017 125 722 A1, wherein the connector is configured so as to fasten a first component, preferably a door module, to a second component, preferably a door, of a motor vehicle, wherein the connector comprises an abutment collar for abutment on a top side of the first component, a cross-bar having one or more upper abutment surfaces for abutment on a bottom side of the second component and for tensioning the second component against a lower abutment surface of the first component in a twisted final assembly position, a shaft portion bearing the cross-bar and aligned in the axial direction for being guided through corresponding breakthroughs in the components as well as fastening means for fastening the connector to the first component in a pre-assembly position, wherein the connector additionally comprises a rotational locking device arranged between the cross-bar and the abutment collar, which is set up so as to lock and then only release a twisting of the connector relative to the first component in the pre-assembly position when the connector has been moved out of the pre-assembly position towards the final assembly position, i.e., preferably axially inserted further into the breakthrough of the first component.

A bayonet lock is a mechanical connection of two cylindrical parts in their longitudinal axis that can be quickly established and then released. The parts are connected by interlocking and opposite rotation and separated in the same way.

The part that is pushed over the other has a longitudinal slit, at the end of which a short transverse slit is arranged perpendicularly. The other part, by contrast, has a button that is inserted into the transverse slot and then causes the fixed connection.

The connection occurs via a push-and-rotate motion. The two parts to be connected are placed inside one another. In both parts, elongated protrusions are mounted approximately perpendicular to the insertion direction at the connection point. However, these do not run all the way around but are interrupted (otherwise, the interlocking would not be possible). Because the elevations are now slightly oblique in the plane perpendicular to the insertion direction, both parts are pressed against one another by a rotational movement. The bayonet lock therefore works like a threading. Sometimes, an additional catch is used in order to secure the connection. As an alternative to the method of the interlocking rails, a correspondingly shaped recess on one part and a protrusion on the other part can also be used (e.g., in the case of connectors).

SUMMARY

The problem addressed by the present invention is to provide a fastening apparatus that is connectable to components of different thicknesses.

A further problem addressed by the present invention is to form a fastening apparatus that is simply constructed and safe and reliable to use.

A further problem addressed by the present invention is to form a fastening apparatus which offers an alternative to fastening apparatuses known from the prior art.

According to the present invention, there is provided a fastening apparatus for connecting to a component.

It comprises a base element for insertion into a preferably contoured passage opening of a component, wherein the base element comprises a first fastening portion in which at least one bayonet-like fastening means is configured for retentive abutment on an edge region, in particular on contour elements, of a first component surface of the component, and a rotary element arranged on the base element, having a second fastening portion, in which at least one abutting means is configured for retentive abutment, preferably on an edge region of the passage opening, of a second component surface of a component, and wherein the base element and the rotary element are rotatably and axially slidably coupled to one another by means of a threaded axial displacement device.

The fastening apparatus is configured so as to connect to components of different thicknesses.

Preferably, the fastening apparatus is provided for introduction into a contoured passage opening of a component. In the context of the present invention, a contoured passage opening is understood to mean a passage opening at whose edge region at least two or preferably three or four or five contour elements or lobes are molded, which extend radially inwardly and in particular are equidistant. The passage opening can thus have a shape that deviates from a circular surface or is not circular or not completely circular.

Due to the fact that the base element comprises a first fastening portion with bayonet-like fastening means and the rotary element comprises a second fastening portion with at least one abutting means and the base element and the rotary element are rotatably and axially slidably coupled to one another by means of the threaded axial displacement device, the base element and the rotary element can be mounted on both sides or both component surfaces of a component adjacent to a contoured passage opening and connected to one another via the axial displacement device.

The axial displacement device can fixedly connect the base element and the rotary element or the bayonet-like fastening means and the abutting means to one another at different distances corresponding to the thickness of a component. In this way, the fastening apparatus can be connected to components of different thicknesses or can be fastened to components of different thicknesses.

The fastening apparatus can in particular comprise one or more functional elements or can be connected to functional elements, wherein the latter can be connected to the fastening apparatus via any kind of fastening means or by integral molding. Such a functional element can be, for example, a membrane, a plug, a conduit, a cable guide, a valve, or the like in the context of the present invention.

In the context of the present invention, a first component surface can be, for example, a top side of a component, and the second component surface can be a bottom side of a component or vice versa. This means that a first and a second component surface are oriented opposite to one another or their surfaces face in opposite directions.

The base element can be approximately tubular, with or without a passage opening. The rotary element can be shaped like a bowl, with or without a passage opening.

The abutting means arranged in the second fastening portion of the rotary element for retentive abutment on a second component surface of a component can preferably be configured as a radially circumferential, circular-annular abutting portion.

The bayonet-like fastening means of the base element comprises one or two or preferably three or also four radially circumferentially arranged and in particular equidistant retaining means for retentive abutment on contour elements of a first component surface of a component.

In addition, the base element comprises one or more rotation-limiting stops extending in an axial direction, which cooperate with a contour element of a component such that a predetermined rotational movement of the base element is limited, wherein the base element and the rotary element thereafter move together in the axial direction for retentive abutment on a component.

The retaining means of the bayonet-like fastening means are set into a rotational movement via a rotational movement of the rotary element, which is transferred to the base element, and in doing so, rearwardly engage with the contour elements of a component by their retaining means.

In this way, the ramp-like retaining means retentively abut the contour elements.

A rotational movement of the rotary element is transferred to the base element until the rotation-limiting stops of the base element extending in the axial direction hit edges of the contour elements of a component so that the rotational movement is stopped.

This rotational movement up to hitting the rotation-limiting stops of the base element at the edges of the contour elements of a component depends on the thickness of a corresponding component. The thinner the component, the larger the turning angle, and the thicker the component, the smaller the turning angle. The turning angle is, for example, a quarter or third or half rotation in the direction of rotation around an axial or longitudinal axis. This means a rotation about a turning angle of, for example, 20° or 30° or 45° or 60° or 75° or 90° or 120° or 150°.

The base element is now moved in the axial direction in the direction of the rotary element or towards the same by a further rotational movement of the rotary element in a rotational direction about the axial axis.

Preferably, the rotation-limiting stops can be an integral component of the ramp elements or integrally molded thereon.

A frictional resistance can exist between the base element and the rotary element such that the base element can be rotated about the axial axis by a rotational movement of the base element until the limiting stops of the base element hit contour elements of a passage opening of a component.

By providing a corresponding frictional resistance in the region in which the base element and the rotary element are coupled to one another, a rotational movement in a rotational direction can be transferred from the rotary element to the base element so that it is moved together with the rotary element in the rotational direction. In this case, it is not necessarily provided that the base element moves in the same direction of rotation or moves synchronously with the rotary element. It is only important that the frictional resistance in the coupling range between the rotary element and the base element is sufficiently large such that the base element is rotated by the rotary element, even if it is a type of towing rotation, or the like.

According to a first exemplary embodiment, the threaded axial displacement device can comprise an outer threading of the base element and an inner threading of the rotary element that is engaged with the outer threading of the base element, wherein this threaded connection then also generates the necessary frictional resistance.

According to a second exemplary embodiment, the thread-like axial displacement device comprises first ramp elements of the base element and correspondingly configured second ramp elements of the rotary element, wherein frictional resistance contours are provided between the base element and the rotary element in order to generate the frictional resistance.

In this case, corresponding first ramp surfaces of the first ramp elements and correspondingly configured second ramp surfaces of the second ramp elements are technically equivalent to the threaded connection of the first exemplary embodiment. They can then form a multi-start threading, for example a three-start threading.

The frictional resistance contours can, for example, be configured as a knurling configured radially circumferential on an outer sheath wall of the base element or as structures extending in an axial direction. Additionally and/or alternatively, a corresponding knurling or structures extending in the axial direction can also be configured on radially inwardly facing surfaces of the second ramp elements of the rotary element.

An axial stop device can be configured between the base element and the rotary element, which prevents the base element and the rotary element from moving towards one another upon insertion of the fastening apparatus into a passage opening of a component.

The axial stop device ensures that, in a fastening apparatus according to the second exemplary embodiment, the base element does not slide in the axial direction in the direction of the rotary element and does not move towards it when the base element is introduced into a contoured passage opening of a component and hits there, for example on a contour element or an edge of the component delimiting the passage opening.

Furthermore, according to the first exemplary embodiment, it can be provided that the base element has a tubular insertion portion at a region opposite the rotary element, wherein a free end of this tubular portion is conically tapered so as to facilitate insertion of the fastening apparatus into a contoured passage opening of a component.

According to the first exemplary embodiment, the axial stop mechanism can be configured by means of thread starts of the threaded connection between the base element and the rotary element. According to the first exemplary embodiment, the axial stop device is thus an integral component of the axial displacement device, which connects the base element and the rotary element to one another.

According to the second exemplary embodiment, it is provided that the axial stop device is configured by surfaces of ramp-like stop elements of the rotary element, said surfaces extending orthogonally to the axial direction, and by surfaces of the first ramp element of the base element, said surfaces extending orthogonally to the axial direction.

Furthermore, the ramp-like stop elements and the second ramp elements according to the second exemplary embodiment are respectively radially circumferentially and equidistantly molded to one another at end regions of an inner sheath wall of the tubular rotary element, said ends being opposite to one another in the axial direction, and arranged offset from one another in the axial direction.

Also according to the second exemplary embodiment, the retaining means of the bayonet-like fastening means and the first ramp elements of the base element can be configured radially circumferentially and equidistantly at opposite end regions of an outer sheath wall of the tubular base element and arranged so as to be flush with one another in an axial direction.

The above construction or structure facilitates the technical function or the fastening process of the individual technical features of the present invention.

The abutting portion of the abutting means can have a radially circumferential sealing element with a sealing lip, or a separate sealing element can also be provided so that the rotary element can sealingly abut a second component surface of a component.

The fastening apparatus can preferably be made from plastic by means of an injection molding method.

Furthermore, according to the present invention, there is provided a fastening system comprising the present fastening apparatus and a component having a contoured passage opening.

Preferably, one or two or preferably three or also four contour elements extending radially inwardly can be configured radially circumferentially and equidistantly along the passage opening of the component.

The advantages of the fastening system according to the invention correspond analogously to the advantages described above of the fastening apparatus according to the invention.

In addition, according to the present invention, a method for connecting a fastening apparatus as described above to a component having a contoured passage opening is provided. This method comprises the following steps:

- introducing a base element of a fastening apparatus into a contoured passage opening of a component in an axial direction,
- setting a rotary element into a rotational movement about an axial axis, such that this rotational movement is at least partially transferred to the base element,
- hitting rotation-limiting stops of the base element at contour elements of the passage opening and stopping the rotational movement of the base element, wherein at the same time retaining means of a bayonet-like fastening means of the base element rearwardly engage with the contour elements of the passage opening and thus a first component surface,
- sliding of first ramp elements of the base element along correspondingly configured second ramp elements of the rotary element or sliding along of a threaded connection between an outer threading of the base element and an inner threading of the rotary element in order to move the base element and the rotary element towards one another in the axial direction,
- hitting an abutting means of the rotary element against a second component surface of the component, such that the rotary element retentively abuts a second component surface with the abutting means.

In this way, the fastening apparatus according to the invention is securely and reliably connected via the bayonet-like fasteners in the region of the contour elements to a first component surface of a component and via the abutting means of the rotary element to an opposite second surface of the component.

Thus, functional elements can be connected to a component of different thicknesses in a simple manner as well as in a safe and reliable manner with the fastening apparatus according to the invention.

The technical features of the present invention and in particular of the first and second exemplary embodiments of the present invention can be combined as desired, insofar as technically possible and meaningful.

BRIEF DESCRIPTION OF THE DRAWINGS

The present invention will be described in further detail below on the basis of two exemplary embodiments shown in the figures. The figures show.

DETAILED DESCRIPTION

Figures 1, 2, 3, 4, 5, 6:
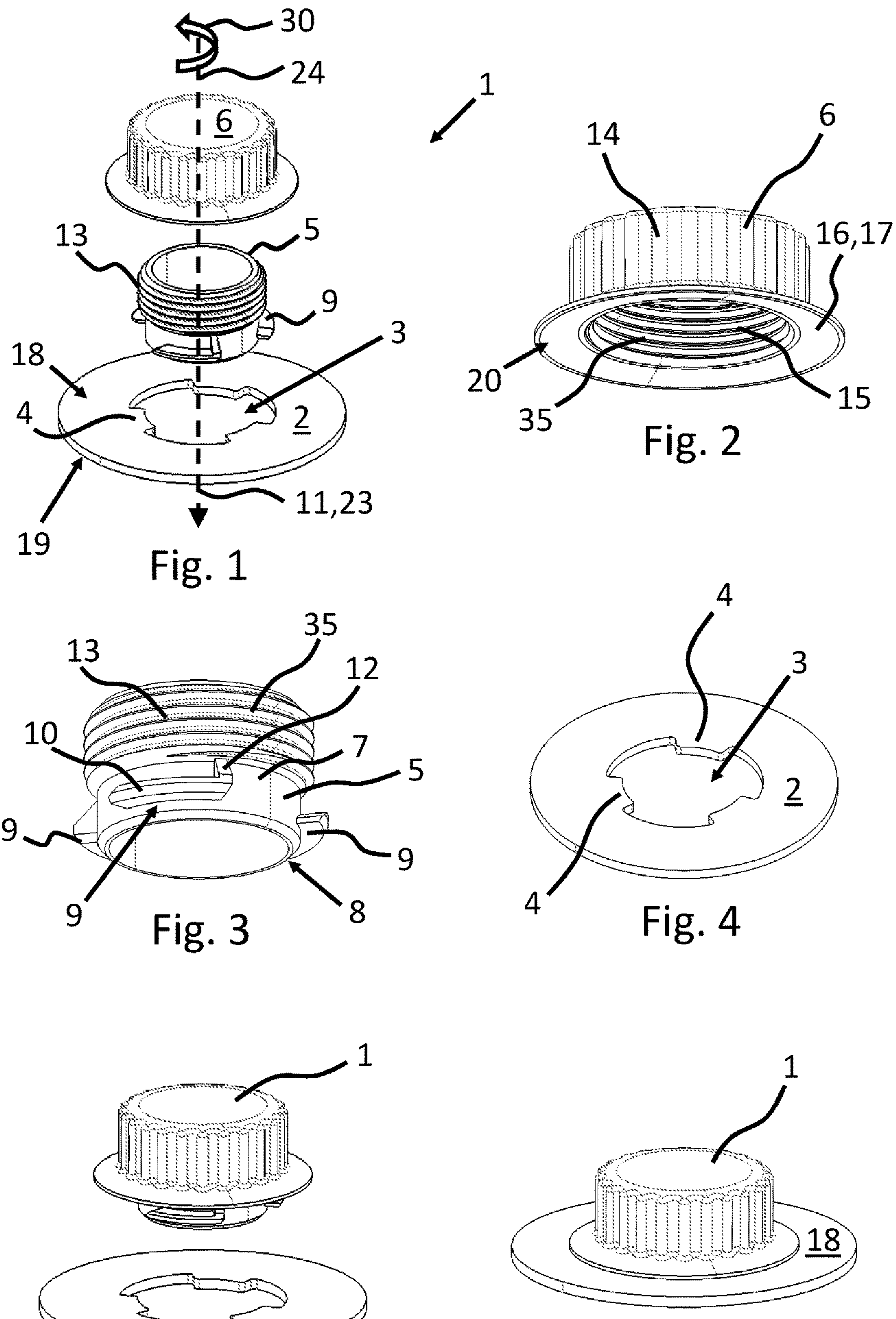
FIG. 1 a perspective exploded view of a fastening apparatus according to the invention according to a first exemplary embodiment, FIG. 2 a perspective view of a rotary element of the fastening apparatus, FIG. 3 a perspective view of a base element of the fastening apparatus, FIG. 4 a perspective view of a region of a component having a contoured passage opening with contour elements, FIG. 5 a perspective view of the fastening apparatus with the component, FIG. 6 a perspective view in a state of being arranged in a final assembly position in a component, FIG. 7 a perspective view of the fastening apparatus in a state of not being fastened to a component, FIG. 8 a perspective view of the fastening apparatus in a state of being assembled on a component, FIG. 9 a perspective exploded view of a fastening apparatus according to the invention according to a second exemplary embodiment, FIG. 10 a perspective view of a rotary element of the fastening apparatus, FIG. 11 a further perspective view of the rotary element of the fastening apparatus, FIG. 12 a perspective view of a base element of the fastening apparatus, FIG. 13 a further perspective view of the base element of the fastening apparatus, FIG. 14 a perspective view of the fastening apparatus having a component in a non-assembled state, FIG. 15 a perspective view of the fastening apparatus in a state of being assembled on a component, FIG. 16 a further perspective view of the fastening apparatus from FIG. 14, and FIG. 17 a further perspective view of the fastening apparatus from FIG. 15.
Figures 7, 8, 9, 10, 11:
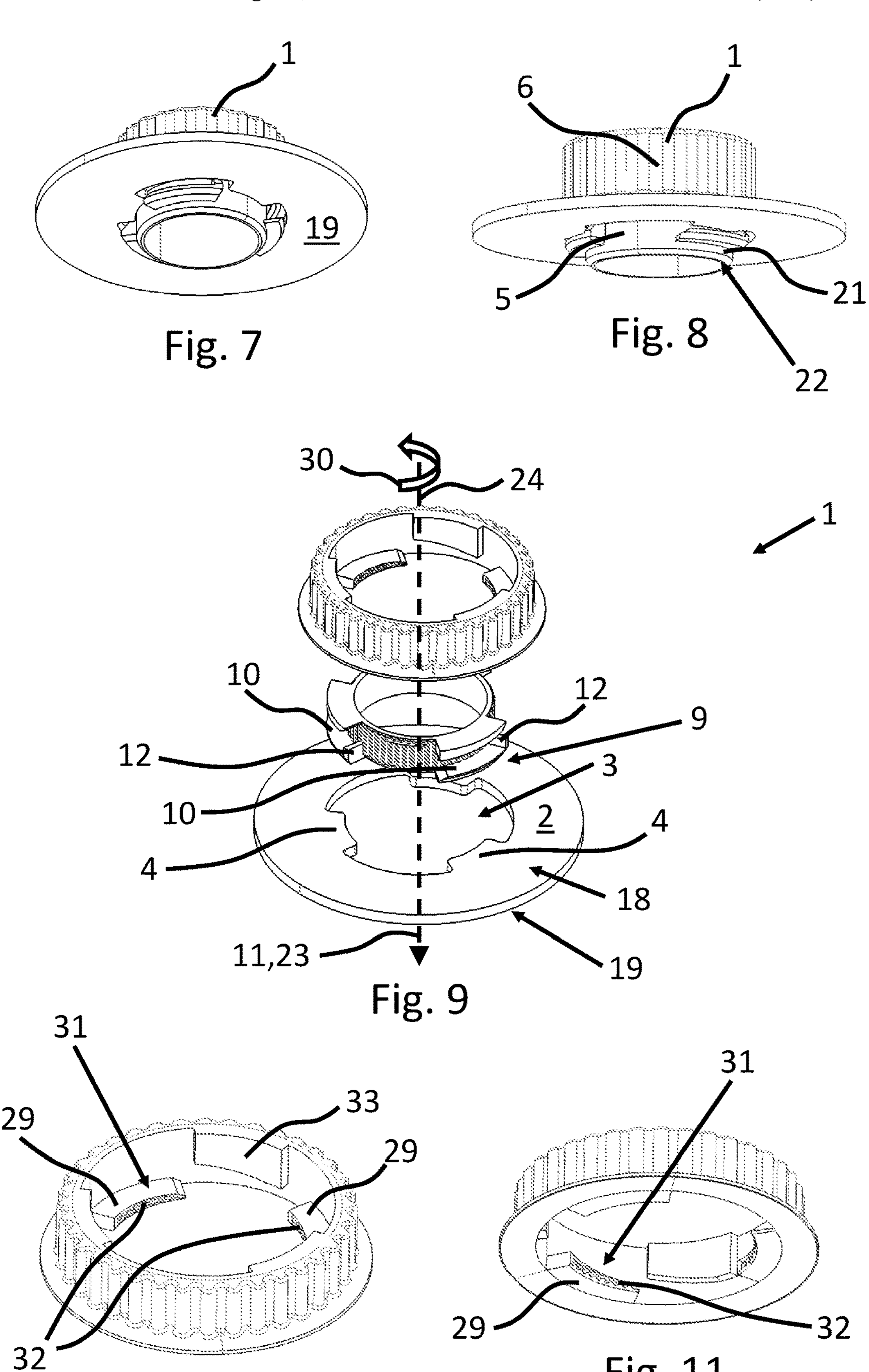

In the following, a fastening apparatus 1 according to the invention is described by way of example in further detail on the basis of a first exemplary embodiment (FIGS. 1 to 8).

The fastening apparatus 1 is configured so as to attach a functional element (not shown) to a component 2. This fastening apparatus 1 is characterized in that it can be connected to components 2 of different thickness and can therefore be used flexibly for different component thicknesses.

A corresponding component 2 comprises a contoured passage opening 3 having contour elements 4 extending in the radial direction.

The fastening apparatus is configured in two parts according to this exemplary embodiment and comprises a base element 5 and a rotary element 6.

The base element 5 and the rotary element 6 are rotatably and axially slidably coupled to one another by means of a threaded axial displacement device 35.

The base element 5 is approximately tubular and has three bayonet-like fastening means 9 which are radially circumferentially and equidistantly arranged on an outer sheath wall 7 of the base element at an axial end region, which is hereinafter referred to as the first fastening portion 8.

The bayonet-like fastening means 9 comprise retaining means 10, wherein the retaining means 10 are configured as retaining portions extending in the radial direction outwardly. The retaining portions of the retaining means 10 extend approximately orthogonally to an axial direction 11.

Rotation-limiting stops 12 extending in the axial direction are configured on the retaining means 10.

In the axial direction 11, opposite the bayonet-like fastening means 9, an outer threading 13 is integrally configured on the outer sheath wall 7 of the base element 5.

The rotary element 6 is approximately bowl-shaped and comprises a tubular portion 14.

A knurling is configured on an outer sheath wall of the tubular portion in order to be able to manually more easily set the rotary element 6 into a rotational movement.

In the tubular portion 14, an inner threading 15 is configured on an inner sheath wall 28 of the cover element 6, corresponding to the outer threading 13 of the base element 5.

Furthermore, the lid element 6 comprises abutting means 16 for retentive abutment on a second component surface 18 of a component 2. The abutting means 16 is configured as a circular-annular radially circumferential abutting portion 17.

In order to sealingly abut a second component surface 18, a sealing lip configured by a two-component injection molding method can be provided on the abutting portion 17. Alternatively, a corresponding sealing ring can also be provided.

The region in which the abutting means 16 is integrally configured with the rotary element is referred to as the second fastening portion 20.

In addition, an axial end region is provided on the base element 5 adjacent to the bayonet-like fastening means 9 as an annular portion 21. A free end of this annular portion has a conically tapering insertion portion 22.

In the following, a method for connecting the fastening apparatus 1 according to the invention to a component 2 or a contoured passage opening 3 of a component 2 is described.

First, the base element 5 of the fastening apparatus 1 is inserted with a screwed-on rotary element 6 in the axial direction 11 into the contoured passage opening 3 of the component 2, wherein the bayonet-like fastening means 9 are arranged in the region between two adjacent contour elements 4 of the contoured passage opening 3.

A movement in the axial direction 11 corresponds to a movement in an assembly direction 23. In the context of the present invention, the assembly direction 23 is defined as a direction in which the fastening apparatus 1 is inserted into a passage opening 3 of a component 2, wherein this direction extends orthogonally to a component surface 18 delimiting a passage opening 3.

As soon as the abutment portion 17 of the rotary element 6 abuts the second component surface 18 by the movement in the axial direction 11, the rotary element 6 is manually set into a rotational movement about an axial axis 24.

First, the base element 5 coupled to the rotary element via the corresponding threaded connection 15, 13 with the rotary element is set into a rotational movement.

The retaining means 10 of the bayonet-like fastening means 9 thereby abut the contour elements 4 of the contoured passage opening 3.

The rotational movement is continued until the rotation-limiting stops 12 of the base element 5 hit the contour elements 4. Thus, the rotational movement of the base element is limited.

The rotary element 6 is further subjected to rotational movement and moves through the threaded connection 13, 15 towards the second component surface 18, until the abutting portion 17 of the abutting means 16 hits the second component surface.

The fastening apparatus is now securely and reliably connected to a component.

In the following, the fastening apparatus according to the invention is described in further detail on the basis of a second exemplary embodiment (FIGS. 9 to 17). Unless otherwise described, the fastening apparatus 1 according to the second exemplary embodiment has the same technical features as the fastening apparatus 1 according to the first embodiment. Identical technical features bear the same reference numerals.

Additionally, the technical features of the two exemplary embodiments can be combined as desired with one another, insofar as technically possible and sensible.

The base element 5 according to the second exemplary embodiment comprises the same bayonet-like fastening means 9 with retaining means 10 and rotation-limiting stops 12.

A knurling 25 is integrally configured on the outer sheath wall 7 of the base element 5. This knurling 25 forms a frictional resistance contour in order to generate a frictional resistance in the direction of rotation between the base element 5 and the rotary element 6.

Three first ramp elements 26 are integrally configured radially and equidistantly another on a region of the base element which is opposite to the bayonet-like fastening means 9 in the axial direction 11. These first ramp elements 26 have a ramp surface 27 rising in the direction of rotation.

The first ramp elements 26 are arranged in an axial direction 11 so as to be flush or congruent with the bayonet-like fastening means 9.

Second ramp elements 29 configured on an inner sheath wall 28 of the lid element 6 are integrally configured so as to correspond to the first ramp elements 26 of the base element. The second ramp elements 29 also have ramp surfaces 31 rising in the direction of rotation 30.

The first ramp surfaces 27 of the first ramp elements 26 are configured so as to correspond to the second ramp surfaces 31 of the second ramp elements 29.

Furthermore, a knurling 32 is also configured on a radially-inwardly facing surface of the second ramp elements 29, which also forms a frictional resistance contour.

Ramp-like stop elements 33 are integrally configured on a region opposite the second ramp elements 29 of the inner sheath walls 28 of the lid element. A surface extending orthogonally to the axial direction 11 of the ramp-like stop elements 33 together with a surface extending orthogonally to the axial direction 11 of the first ramp elements 26 of the base element 5 forms an axial stop device 34.

The ramp-like stop elements 33 of the rotary element 6 have ramps facing in the assembly direction to provide a clearance for movement of the base element when screwing the fastening apparatus tight. When loosening the fastening apparatus, the ramps serve as a disassembly aid for pushing the base element out of the component in the axial direction or in the assembly direction.

The ramp-like stop elements 33 are offset in the axial direction or are arranged so as to alternate with the second ramp elements 29.

In the following, a method according to the invention for connecting the fastening apparatus according to the invention according to a second exemplary embodiment to a component 2 is described.

First, the fastening apparatus 1 is inserted into the contoured passage 2 of the component via the base element 5 such that the bayonet-like fastening means 9 and the first ramp elements 26 are arranged in the region between the contour elements 4 of the contoured passage 3 of the component 2.

Then, the rotary element 6 is rotated in a rotational direction 30 about the axial axis 24 or is subjected to a corresponding rotational movement.

The retaining means 10 of the bayonet-like fastening means 9 rearwardly engage with the contour elements 4 of the contoured passage opening until the rotation-limiting stops 12 hit the contour elements 4.

Thereafter, the base element 5 no longer moves in the direction of rotation, however, the rotary element 6 is still subjected to a rotational movement. The first ramp surfaces 27 of the first ramp elements 26 of the base element then slide along the second ramp surfaces 31 of the second ramp elements 29 of the rotary element.

Due to the fact that both the first ramp surfaces 27 and the second ramp surfaces 31 are configured so as to rise in the direction of rotation, the base element 5 and the rotary element 6 are moved towards one another in the axial direction 11 until the abutting portion 17 of the abutting means 16 of the rotary element retentively abuts the second component surface 18.

Due to the frictional resistance contours of the base element 5 and the rotary element 6 or the corresponding knurlings 25 and 32, the rotary element can rotate the base element 5 along in the direction of rotation 30 at the beginning of the fastening process.

LIST OF REFERENCE NUMERALS

1 Fastening apparatus
2 Component
3 Contoured passage opening
4 Contour element
5 Base element
6 Rotary element
7 Outer sheath wall of the base element
8 First fastening portion
9 Bayonet-like fastening means
10 Retaining means
11 Axial direction
12 Rotation-limiting stop
13 Outer threading
14 Tubular portion
15 Inner threading
16 Abutting means
17 Abutting portion
18 Second component surface
19 First component surface
20 Second fastening portion
21 Annular portion
22 Conically tapering insertion portion
23 Assembly direction
24 Axial axis
25 Knurling
26 First ramp elements
27 First ramp surface
28 Inner sheath wall of the lid element
29 Second ramp elements
30 Direction of rotation
31 Second ramp surface
32 Knurling
33 Ramp-like stop elements
34 Axial stop device

The invention claimed is:

1. A fastening apparatus for connecting to a component, comprising:

a base element for insertion into a passage opening of the component, wherein the base element comprises a first fastening portion, in which at least one bayonet-like fastening means is formed for retentive abutment on an edge region of a first component surface of the component, and a rotary element arranged on the base element, having a second fastening portion, in which an abutting means is formed on the rotary element for retentive abutment on a second component surface of the component, and wherein the base element and the rotary element are rotatably and axially slidably coupled to one another by means of a threaded axial displacement device;

wherein frictional resistance exists between the base element and the rotary element so that by a rotational movement of the rotary element the base member is rotated about an axial axis, wherein the rotational movement of the rotary element causes rotation of the base element about the axial axis until rotation-limiting stops of the base element are configured to hit contour elements of the passage opening of the component, at which point rotation of the base element stops and further rotational movement of the rotary element causes the rotary element to rotate relative to the base element.

2. The fastening apparatus according to claim 1, wherein the at least one bayonet-like fastening means of the base element comprises one or more radially circumferentially arranged retaining means for retentive abutment on the contour elements of the component, the contour elements being a part of the first component surface, and wherein the base element comprises one or more rotation-limiting stops extending in an axial direction, which are configured to cooperate with the contour elements of the component such that a predetermined rotational movement of the base element is limited, wherein the base element and the rotary element thereafter move together in the axial direction for retentive abutment.

3. The fastening apparatus according to claim 1, wherein the axial displacement device comprises a threaded connection formed by an outer threading of the base element and an inner threading of the rotary element engaged with the outer threading of the base element, wherein the threaded connection generates the frictional resistance.

4. The fastening apparatus according to claim 1, wherein the axial displacement device comprises first ramp elements of the base element and correspondingly formed second ramp elements of the rotary element, wherein frictional resistance contours are provided between the base element and the rotary element in order to generate the frictional resistance.

5. The fastening apparatus according to claim 1, wherein an axial stop device is formed between the base element and the rotary element, which prevents the base element and the rotary element from moving towards one another upon insertion of the fastening apparatus into the passage opening.

6. The fastening apparatus according to claim 5, wherein the axial stop device comprises thread starts of a threaded connection, or the axial stop device comprises surfaces of ramp-like stop elements of the rotary element, said surfaces of the ramp-like stop elements extending orthogonally to an axial direction, and the axial stop device comprises surfaces of first ramp elements of the base element, said surfaces of the first ramp elements extending orthogonally to the axial direction.

7. The fastening apparatus according to claim 6, wherein the ramp-like stop elements and second ramp elements of the rotary element are respectively radially circumferentially and equidistantly molded to end regions of an inner sheath wall of the rotary element and arranged offset from one another in the axial direction, said end regions being opposite to one another in the axial direction, and ramp-like retaining means of the at least one bayonet-like fastening means and the first ramp elements of the base element are radially circumferentially and equidistantly molded at opposite end regions of an outer sheath wall of the base element and arranged so as to be flush with one another in the axial direction.

8. A fastening system comprising the fastening apparatus according to claim 1 and a component having a contoured passage opening, wherein one or more contour elements extending radially inwardly are arranged radially circumferentially and equidistantly along the passage opening of the component.

9. The fastening apparatus of claim 1, wherein, in a final assembly position, a top of the rotary element is located higher than a top of the base element.

10. The fastening apparatus of claim 1, wherein the rotary element includes a top wall that, in a final assembly position, overlies a top of the rotary element.

11. A method for connecting a fastening apparatus to a component having a contoured passage opening, comprising the following steps:

introducing a base element of the fastening apparatus into the contoured passage opening of the component in an axial direction, setting a rotary element into a rotational movement about an axial axis, such that this rotational movement is at least partially transferred to the base element by a frictional resistance between the rotary element and the base element, during the rotational movement of the rotary element, hitting rotation-limiting stops of the base element at contour elements of the passage opening and stopping the rotational movement of the base element as the rotary element continues to rotate, wherein at the same time retaining means of a bayonet-like fastening means of the base element rearwardly engage with the contour elements of the passage opening and thus a first component surface, sliding of first ramp elements of the base element along correspondingly formed second ramp elements of the rotary element or sliding along of a threaded connection between an outer threading of the base element and an inner threading of the rotary element in order to move the base element and the rotary element towards one another in the axial direction as the rotary element rotates relative to the base element, hitting an abutting means of the rotary element against a second component surface of the component, such that the rotary element retentively abuts the second component surface with the abutting means.

* * * * *